United States Patent
Choi et al.

(10) Patent No.: US 9,867,019 B2
(45) Date of Patent: Jan. 9, 2018

(54) METHOD OF CONNECTING ELECTRONIC DEVICES AND ELECTRONIC DEVICE EMPLOYING THE SAME

(71) Applicant: Samsung Electronics Co., Ltd., Gyeonggi-do (KR)

(72) Inventors: Bokun Choi, Seoul (KR); Sunkee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 51 days.

(21) Appl. No.: 14/630,533

(22) Filed: Feb. 24, 2015

(65) Prior Publication Data

US 2015/0245183 A1 Aug. 27, 2015

(30) Foreign Application Priority Data

Feb. 24, 2014 (KR) ........................ 10-2014-0021513

(51) Int. Cl.
*H04W 4/00* (2009.01)
*H04W 4/08* (2009.01)
*H04W 76/02* (2009.01)
*H04W 84/12* (2009.01)

(52) U.S. Cl.
CPC ............. *H04W 4/08* (2013.01); *H04W 4/008* (2013.01); *H04W 76/023* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,392,630 B2* | 7/2016 | Yi | .......... | H04W 74/04 |
| 2011/0225305 A1* | 9/2011 | Vedantham | ........... | G06F 1/3203 709/227 |
| 2011/0317586 A1* | 12/2011 | Palanki | ................. | H04W 8/005 370/254 |
| 2012/0224569 A1* | 9/2012 | Kubota | ................. | H04W 84/20 370/338 |
| 2012/0290730 A1* | 11/2012 | Desai | .................... | H04L 67/104 709/228 |
| 2013/0040576 A1* | 2/2013 | Yoon | ..................... | H04W 8/005 455/41.2 |
| 2013/0339504 A1* | 12/2013 | Montemurro | ......... | H04W 12/06 709/223 |
| 2014/0025801 A1* | 1/2014 | Garg | ....................... | H04W 4/08 709/223 |

(Continued)

FOREIGN PATENT DOCUMENTS

KR 10-2013-0016609 2/2013

*Primary Examiner* — Kibrom T Hailu

(57) ABSTRACT

Disclosed is a method of establishing connection of an electronic device using Wi-Fi P2P to at least one another electronic device, the method includes creating a stability value of the electronic device based on internal state information of the electronic device. The method also includes determining an intent value of the electronic device in response to the stability value. The method also includes receiving an intent value of the at least one another electronic device. The method also includes comparing the intent value of the electronic device with the intent value of the at least one another electronic device. The method also includes forming a Wi-Fi P2P group acting as any one of a group owner (GO) and a group client (GC).

15 Claims, 8 Drawing Sheets

(56) References Cited

U.S. PATENT DOCUMENTS

| | | | |
|---|---|---|---|
| 2014/0078928 A1* | 3/2014 | Verma | H04W 84/20 370/254 |
| 2014/0206285 A1* | 7/2014 | Jance | H04W 76/025 455/41.2 |
| 2015/0215028 A1* | 7/2015 | Ljung | H04W 88/04 370/315 |
| 2015/0223029 A1* | 8/2015 | Kanno | H04W 4/08 370/254 |

* cited by examiner

FIG. 6

<LOOKUP TABLE (Look up- Table)>

| STABILITY VALUE | INTENT VALUE |
|---|---|
| 0 - 399 | 0 |
| 400 - 799 | 1 |
| 800 - 1199 | 2 |
| 1200 - 1599 | 3 |
| 1600 - 1999 | 4 |
| 2000 - 2399 | 5 |
| 2400 - 2799 | 6 |
| 2800 - 3199 | 7 |
| 3200 - 3599 → | 8 |
| 3600 - 3999 | 9 |
| 4000 - 4399 | 10 |
| 4400 - 4799 → | 11 |
| 4800 - 5199 | 12 |
| 5200 - 5599 | 13 |
| 5600 - 5999 | 14 |
| 6000 - Max | 15 |

ELECTRONIC DEVICE 100 → row 3200-3599 / 8

ANOTHER ELECTRONIC DEVICE 200 → row 4400-4799 / 11

METHOD OF CONNECTING ELECTRONIC DEVICES AND ELECTRONIC DEVICE EMPLOYING THE SAME

CROSS-REFERENCE TO RELATED APPLICATION AND CLAIM OF PRIORITY

The present application is related to and claims priority from and the benefit under 35 U.S.C. §119(a) of Korean Patent Application No. 10-2014-0021513, filed on Feb. 24, 2014, which is hereby incorporated by reference for all purposes as if fully set forth herein.

TECHNICAL FIELD

The present disclosure relates generally to a method of connecting electronic devices and an electronic device employing the same, and more particularly, to a method of forming a Wi-Fi P2P group between electronic devices using Wi-Fi Direct and an electronic device employing the same.

BACKGROUND

As electronic devices have developed in the form of portable terminals such as smartphones, they can provide users with various available functions through applications having various functions. In recent years, among various functions of the electronic devices, a technology called Wi-Fi Direct has been highlighted.

The Wi-Fi Direct technology is a technology of providing a basis for providing contents and services between electronic devices through direct communications between terminals without using a separate facility such as an Access Point (AP) or a router while a Wi-Fi Direct device is mounted to a portable terminals such as a TV, a laptop computer, a printer, or a camera. The standard for the Wi-Fi Direct technology is commonly called Wi-Fi P2P.

A Wi-Fi Direct user may feel that the system is operated in a P2P method without using an AP, but actually one terminal acts as an AP. In the Wi-Fi P2P standard, an electronic device acting as an AP of a Wi-Fi P2P group is called a group owner (hereinafter, referred to as a GO). Various group clients (hereinafter, referred to as GCs) may exist in addition to the GO, and only one electronic device may act as a GO in a single Wi-Fi P2P group and the remaining electronic device all act as GCs.

In order to form a Wi-Fi P2P group in Wi-Fi Direct, intent values of electronic devices are compared such that the electronic device having the highest intent value acts as a GO and the remaining electronic devices act as GCs. Because the group owner controls the overall operation of the Wi-Fi P2P group, a stable environment is necessary. An intent value is a value that represents power of intensively performing a task, and may be determined by a policy of the manufacturer or settings of the user. For example, because the GO consumes more power compared with the GCs, the life span of an electronic device such as a smartphone may be shortened due to rapid consumption of battery power if the electronic device acts as a GO.

SUMMARY

When a Wi-Fi P2P group according to the related art is formed, electronic devices individually generate an arbitrary number and the individually formed intent values of the electronic devices are compared with each other without a reference for determining an intent value such that the electronic device that suggests the highest intent value acts as a group owner (GO) and the electronic device that suggests the lower values act as group clients (GCs). Because a GO is determined by comparing arbitrary intent values without a reference for determining an intent value, stability is degraded when a Wi-Fi P2P connection is made between electronic devices.

To address the above-discussed deficiencies, it is a primary object to provide a method of connecting electronic devices in which a GO is selected according to internal state information of the electronic devices to form a Wi-Fi P2P group, and an electronic device employing the same.

In accordance with another aspect of the present disclosure, a method is provided for establishing connection of an electronic device using Wi-Fi P2P to at least one another electronic device, the method including: creating a stability value of the electronic device based on internal state information of the electronic device; determining an intent value of the electronic device in response to the stability value; receiving an intent value of the at least one another electronic device; comparing the intent value of the electronic device with the intent value of the at least one another electronic device; and forming a Wi-Fi P2P group acting as any one of a GO and a group client (GC).

In accordance with another aspect of the present disclosure, an apparatus for providing an electronic device including: a communication unit that includes a Wi-Fi module for providing a short range wireless communication function; and a controller that acquires internal state information of the electronic device, creates a stability value of the electronic device based on the acquired internal state information, determines an intent value in response to the created stability value, receives an intent value of another electronic device, compares the determined intent value with the received intent value, and determines a GO or a GC of the Wi-Fi P2P group.

According to various embodiments of the present disclosure, stability can be improved when electronic devices are connected to each other using Wi-Fi P2P, by selecting a group owner based on internal state information of electronic devices in a group when the GO of the Wi-Fi P2P group is selected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a process of forming a Wi-Fi P2P group by adjusting an intent value according to internal state information of a P2P device according to any one of various embodiments of the present disclosure;

DETAILED DESCRIPTION

Figure 1:
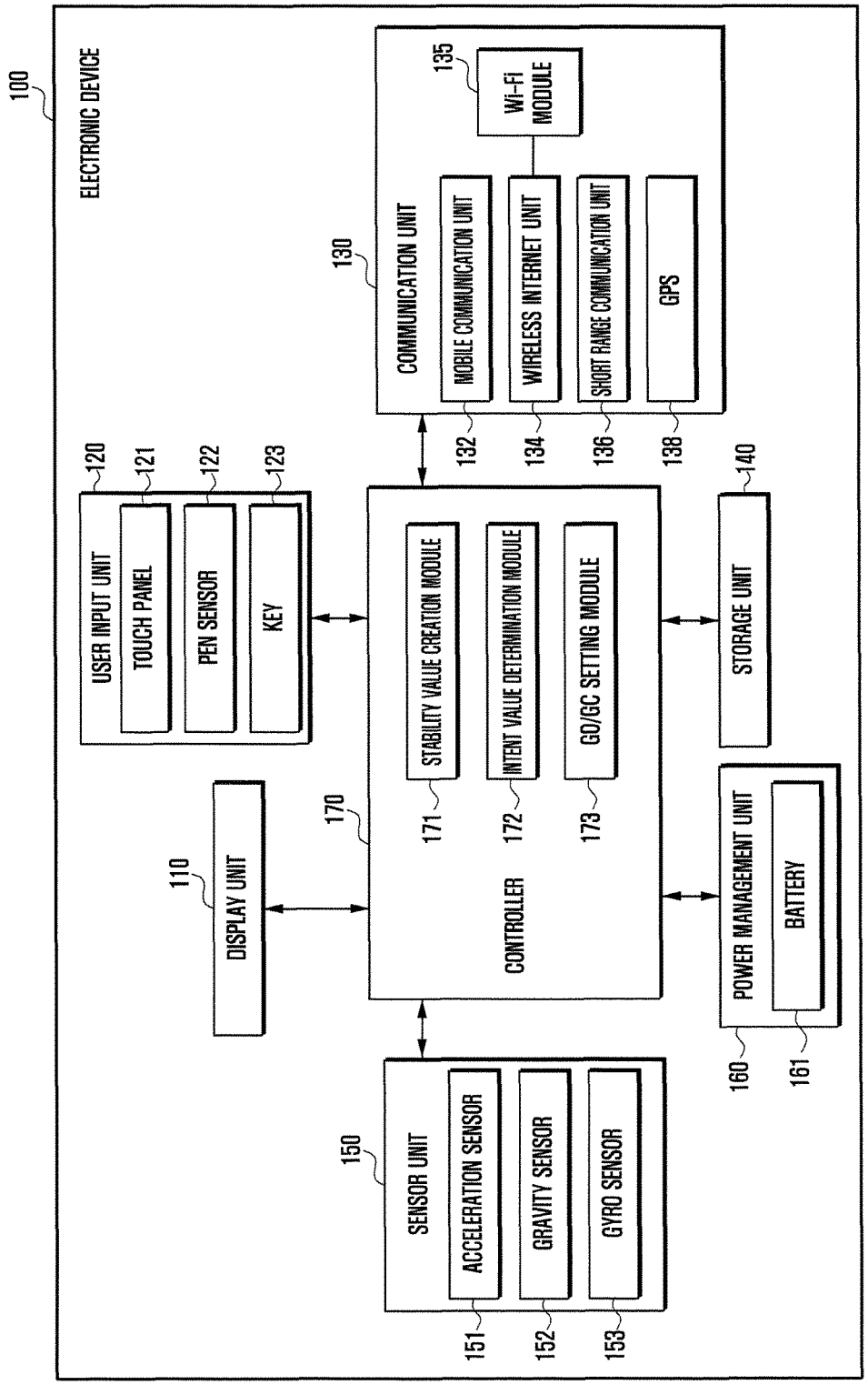
FIG. 1 is a block diagram of an electronic device according to any one of various embodiments of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. Hereinafter, various embodiments of the present disclosure will be described in detail with reference to the accompanying drawings. It should be noted that the same elements will be designated by the same reference numerals although they are shown in different drawings. Further, in the following description of the present disclosure, a detailed description of known functions and configurations incorporated herein will be omitted when it may make the gist of various embodiments disclosed herein rather unclear. In the following description, it should be noted that only parts necessary for understanding operations according to various embodiments disclosed herein will be described, and the description of other parts will be omitted in order to prevent obscuring of the gist of various embodiments disclosed herein.

As used herein, the expression "include" or "may include" refers to the existence of a corresponding function, operation, or element, and does not exclude one or more additional functions, operations, or elements. The terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Also, as used here, the expression "or" includes any or all combinations of words enumerated together. For example, the expression "A or B" can include A, can include B, or can include both A and B.

In the present disclosure, the expressions "a first", "a second", "the first", "the second", and the like can modify various elements, but the corresponding elements are not limited by these expressions. For example, the above expressions do not limit the sequence or importance of the corresponding elements. The above expressions can be used merely for the purpose of distinguishing one element from the other elements. For example, a first user device and a second user device indicate different user devices although both of them are user devices. For example, without departing from the scope of the present disclosure, a first structural element can be named a second structural element. Similarly, the second structural element also can be named the first structural element.

When an element is referred to as being "coupled" or "connected" to any other element, it should be understood that not only the element can be directly coupled or connected to the other element, but also a third element can be interposed between. Contrarily, when an element is referred to as being "directly coupled" or "directly connected" to any other element, it should be understood that no element is interposed between.

In the present disclosure, the terms are used to describe specific embodiments, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device 100 according to the present disclosure can be a device including a communication function. In certain embodiments, the electronic device can be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (such as a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (such as a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box (such as SAMSUNG HOME SYNC® box, APPLE TV® box, or GOOGLE TV® box), an electronic dictionary, a vehicle infotainment device, electronic equipment for a ship (such as navigation equipment for a ship, a gyrocompass, etc.), avionics equipment, a security device, an electronic cloth, an electronic key, a camcorder, a game console, a Head-Mounted Display (HMD), a flat panel display device, an electronic frame, an electronic album, a furniture or a part of a building or structure including a communication function, an electronic board, an electronic signature receiving device, a projector, etc. It is obvious to those skilled in the art that the electronic device according to the present disclosure is not limited to the aforementioned devices.

FIG. 1 illustrates a block diagram of an electronic device 100 according to any one of various embodiments of the present disclosure.

The electronic device 100 includes a display unit 110, a user input unit 120, a communication unit 130, a storage unit 140, a sensor unit 150, a power management unit 160, and a controller 170.

The display unit 110 performs a function of displaying an image or data to the user. The display unit 110 includes a display panel. The display panel can employ, for example, a Liquid Crystal Display (LCD) or an Active Matrix Organic Light Emitting Diode (AMOLED). Then, the display unit 110 further includes a controller for controlling the display panel. The display panel can be, for example, flexible, transparent, or wearable.

Meanwhile, the display unit 110 is coupled to a touch panel 121 to be provided in the form of a touch screen. For example, the touch screen includes an integral module in which the display panel and the touch panel are coupled to each other in a stack structure.

According to various embodiments of the present disclosure, the display unit 110 displays a user interface regarding formation of a Wi-Fi P2P group using a Wi-Fi Direct function between a plurality of P2P devices under the control of the controller 170.

The user input unit 120 receives various commands from the user. The user input unit 120 includes, for example, at least one of the touch panel 121, the pen sensor 122, and the key 123.

The touch panel 121 recognizes a touch input by the user based on, for example, at least one of a capacitive type, a resistive type, an infrared type, and an acoustic wave type. The touch panel 121 further includes a controller (not shown). Meanwhile, the capacitive type realizes a close recognition as well as a direct touch. The touch panel 121 can further include a tactile layer. In certain embodiments, the touch panel 121 provides the user with a tactile reaction. The pen sensor 122 can be realized by using a separate pen recognition sheet, for example, in the same method through which a touch input of the user is made. The key 123 includes, for example, a mechanical key or a touch key. The mechanical key includes at least one of, for example, a power button disposed on one side of the electronic device 100 to turn on a display of the electronic device 100 if pushed, one or more volume buttons disposed on the other side of the electronic device 100 to control volume if pushed, and a home button disposed on a lower center of the display unit 110 of the electronic device 100 to move a screen to a home screen if pushed. The touch key includes, for example, at least one of a menu key provided on one surface of a lower end of the display unit 110 of the portable terminal 110, and a return key provided on another surface of the lower end of the display unit 110 of the electronic device 100, for providing a function of returning to a previous screen of the currently display screen when touched.

The communication unit 130 includes a Wi-Fi module 135, and the Wi-Fi module 135 provides a short range wireless communication function according to the standard of IEEE 802.11.

According to various embodiments of the present disclosure, the user of the electronic device 100 uses a data exchange function (for example, receiving an intent value from at least one another electronic device) by forming (or creating) a Wi-Fi P2P group using a Wi-Fi module. The communication unit 130 searches for a third electronic device using the Wi-Fi module 135, or invites a third electronic device to form a Wi-Fi P2P group again.

Additionally, the communication unit 130 includes at least one of a mobile communication unit 132, a wireless Internet unit 134, a short range communication unit 136, and a GPS 138.

The mobile communication unit 132 transmits or receives a wireless signal to or from at least one of a base station, an external terminal, and a server over the mobile communication network. The wireless signal includes data in various forms according to transmission or reception of a voice call signal, a video call signal, an SMS or multimedia message.

The wireless Internet unit 134 performs a function for an access to a wireless Internet. Use can be made of wireless Internet technologies, such as Wireless Local Area Network (WLAN) (Wi-Fi), Wireless broadband (Wibro), World Interoperability for Microwave Access (Wimax), High Speed Downlink Packet Access (HSDPA), and the like.

The short range communication unit 136 performs a function for short range communication. The short range communication technology can be Bluetooth, Radio Frequency Identification (RFID), Infrared Data Association (IrDA), Ultra Wideband (UWB), and ZigBee.

The GPS 138 receives a signal transmitted from a GPS satellite to measure a current location of the electronic device 100.

According to various embodiments of the present disclosure, the GPS 138 calculates a change in the location of the electronic device 100 to use the change in creating a stability value of the electronic device 100.

The storage unit 140 includes at least one of an internal memory and an external memory. For example, the internal memory includes at least one of a volatile memory (such as a Dynamic Random Access Memory (DRAM), a Synchronous Dynamic RAM (SDRAM), etc.), a non-volatile memory (such as an One Time Programmable Read-Only Memory (OTPROM), a Programmable ROM (PROM), an Erasable and Programmable ROM (EPROM), an Electrically Erasable and Programmable ROM (EEPROM), a Mask ROM, a Flash ROM, etc.), a Hard Disk Drive (HDD), or a Solid State Drive (SSD). According to certain embodiments of the present disclosure, the storage unit 140 loads a command or data received from at least one of the non-volatile memory and other components in the volatile memory and process the loaded command or data. Further, the storage unit 140 stores buffer data received or generated from another component in the nonvolatile memory.

The external memory includes at least one of, for example, a Compact Flash (CF), a Secure Digital (SD), a Micro Secure Digital (Micro-SD), a Mini Secure Digital (Mini-SD), an extreme Digital (xD) and a memory stick.

The storage unit 140 stores an operating system for controlling a resource of the electronic device 100, and an application program for an operation of an application. The operating system can include a kernel, middleware, and an Application Program Interface (API). For example, the operating system can include ANDROID® operating system, iOS, WINDOWS® operating system, Symbian, TIZEN® operating system, and Bada.

According to various embodiments of the present disclosure, the storage unit 140 stores a lookup table for determining an intent value in response to a stability value of the electronic device 100. Meanwhile, the controller 170 creates a stability value of the electronic device 100 through internal state information (for example, including at least one of available power information, mobility information, and available data information) of the electronic device 100. Accordingly, an intent value of the electronic device 100 can be finally determined by substituting a stability value created in the lookup table stored in the storage unit 140.

The sensor unit 150 includes at least one of an acceleration sensor 151, a gravity sensor 152, and a gyro sensor 153. According to various embodiments of the present disclosure, the sensor unit 150 measures or detects a change in a physical property such as acceleration or the effect of gravity on the electronic device and convert the measured or detected information into an electrical signal. The sensor unit 150 can further include a control circuit for controlling at least one sensor pertaining to the sensor unit 150.

The power management unit 160 manages power of the electronic device 100. The power management unit 160 includes, for example, a Power Management Integrated Circuit (PMIC), a charger Integrated Circuit (IC), or a battery gauge. The PMIC can be mounted to, for example, an integrated circuit or an SoC semiconductor. Charging methods can be classified into a wired charging method and a wireless charging method. The charger IC charges a battery and prevents over voltage or over current from flowing from a charger.

According to an embodiment, the charger IC includes a charger IC for at least one of the wired charging method and the wireless charging method. A magnetic resonance scheme, a magnetic induction scheme, or an electromagnetic scheme can be exemplified as the wireless charging method, and an additional circuit for wireless charging, such as a coil loop circuit, a resonance circuit, a rectifier circuit, and the like can be added.

The battery gauge measures, for example, a residual quantity of the battery 161, and a voltage, a current, or a temperature during the charging. The battery 161 stores or generates electricity, and electric power can be supplied to the electronic device 100 using the stored and generated electricity. The battery 161 can include, for example, a rechargeable battery and a solar battery.

The controller 170 controls the overall operation of the electronic device 100, and converts and controls an operation of the electronic device 100 according to a user input through the display unit 110 or the user input unit 120. According to various embodiments of the present disclosure, the controller 170 identifies information of the battery 161 of the electronic device 100. For example, the controller 170 identifies a remaining level of the battery 161 if the electronic device 100 is operated using the battery 161, or identifies whether the battery 161 is being charged. In addition, the controller 170 stores the identified information on the battery 161 to use the information in creating a stability value of the electronic device 100.

According to various embodiments of the present disclosure, the controller 170 acquires a physical property (for example, acceleration or a change in gravity) of the electronic device 100 or internal state information such as movement of the electronic device 100 using the sensor unit 150 and the GPS 138. For example, mobility information of the electronic device 100 can be acquired by using an acceleration sensor 151, a gravity sensor 152, a gyro sensor 153, and the like.

According to various embodiments of the present disclosure, the sensor unit 150 and the GPS 138 measures or detects mobility information of the electronic device 100 in real time to transmit the mobility information to the controller 170 if the information on the movement and state of the electronic device 100 is received. For example, if at least one information element is received, such as when an absolute distance between the electronic device 100 and another electronic device becomes larger due to movement of the user and other factors or the user rapidly makes a motion while staying in place while the absolute value is maintained, the sensor unit 150 and the GPS 138 are activated under the control of the controller 170 to measure or detect mobility information corresponding to the received change.

According to various embodiments of the present disclosure, the sensor unit 150 and the GPS 138 transmits the measured or detected mobility information to the controller 170, and the controller 170 stores the mobility information in the storage unit 140.

According to various embodiments of the present disclosure, a stability value creation module 171 of the controller 170 creates a current stability value of the electronic device 100 using the mobility information stored in the storage unit 140 and stores the created stability value in the storage unit 140 again. The intent value determination module 172 of the controller 170 determines an intent value of the electronic device 100 corresponding to the lookup table stored in the storage unit 140 in advance using the created and stored stability value.

According to various embodiments of the present disclosure, the controller 170 identifies available data information, such as an amount of remaining data, of the electronic device 100 using the communication unit 130. In addition, an intent value of another electronic device can be received for device-to device connection using the Wi-Fi module 135.

According to various embodiments of the present disclosure, the controller 170 collects internal state information including at least one of available power information, mobility information, and available data information of the electronic device 100.

According to various embodiments of the present disclosure, the stability value creation module 171 of the controller 170 creates a stability value in consideration of weights for the collected information.

According to various embodiments of the present disclosure, the intent value determination module 172 of the controller 170 determines an intent value of the electronic device 100 using the lookup table stored in the storage unit 140 and storing the created stability values.

According to various embodiments of the present disclosure, a GO/GC setting module 173 of the controller 170 compares the determined intent value of the electronic device 100 with an intent value received from another electronic device to select a group owner (GO) of the Wi-Fi P2P group or form a Wi-Fi P2P group through the GO.

According to various embodiments of the present disclosure, the controller 170 acquires internal state information of the electronic device 100 at a predetermined period again, the stability value creation module 171 of the controller 170 creates a stability value of the electronic device 100 again based on the internal state information acquired again, and the intent value determination module 172 of the controller 170 renews the intent value of the electronic device 100 in response to the recreated stability value.

According to various embodiments of the present disclosure, a GO/GC setting module 173 of the controller 170 requests the electronic devices forming the group to reselect the GO of the preformed Wi-Fi P2P group if the renewed intent value of the electronic device 100 is lower than the preset limited intent value when the electronic device 100 functions as the GO of the Wi-Fi P2P group.

In certain embodiments, a Wi-Fi P2P group can be formed again by changing the functions of the GO and the group client (GC) while maintaining the connection of an existing Wi-Fi P2P group. The preset limited intent value is a minimum value by which the GO of the Wi-Fi P2P group can be responsible for in order to stabilize the connection between the group.

According to various embodiments of the present disclosure, when the electronic device 100 performs an operation as the GO of the Wi-Fi P2P group, the controller 170 detects an electronic device which does not participate in the Wi-Fi P2P group through the Wi-Fi module 135. In addition, a message which invites the electronic device, which does not participate in the Wi-Fi P2P group through the Wi-Fi module 135, can be transmitted to the corresponding electronic device. If the electronic device which does not participate in the Wi-Fi P2P group accepts an invitation to the preformed Wi-Fi P2P group, the controller 170 forms a Wi-Fi P2P group including the electronic device which does not participate in the Wi-Fi P2P group again.

A device that is always operated through a power source refers to a device, such as a TV, a monitor, a printer, a game console (for example, an Xbox) which forms a Wi-Fi P2P group through wireless communication with the electronic device 100. If the electronic device 100 is a smartphone and the third device is a TV and a Wi-Fi P2P group is formed, the electronic device 100 makes a request such that a music file stored in the smartphone is transmitted to the TV and music is reproduced.

Figure 2:
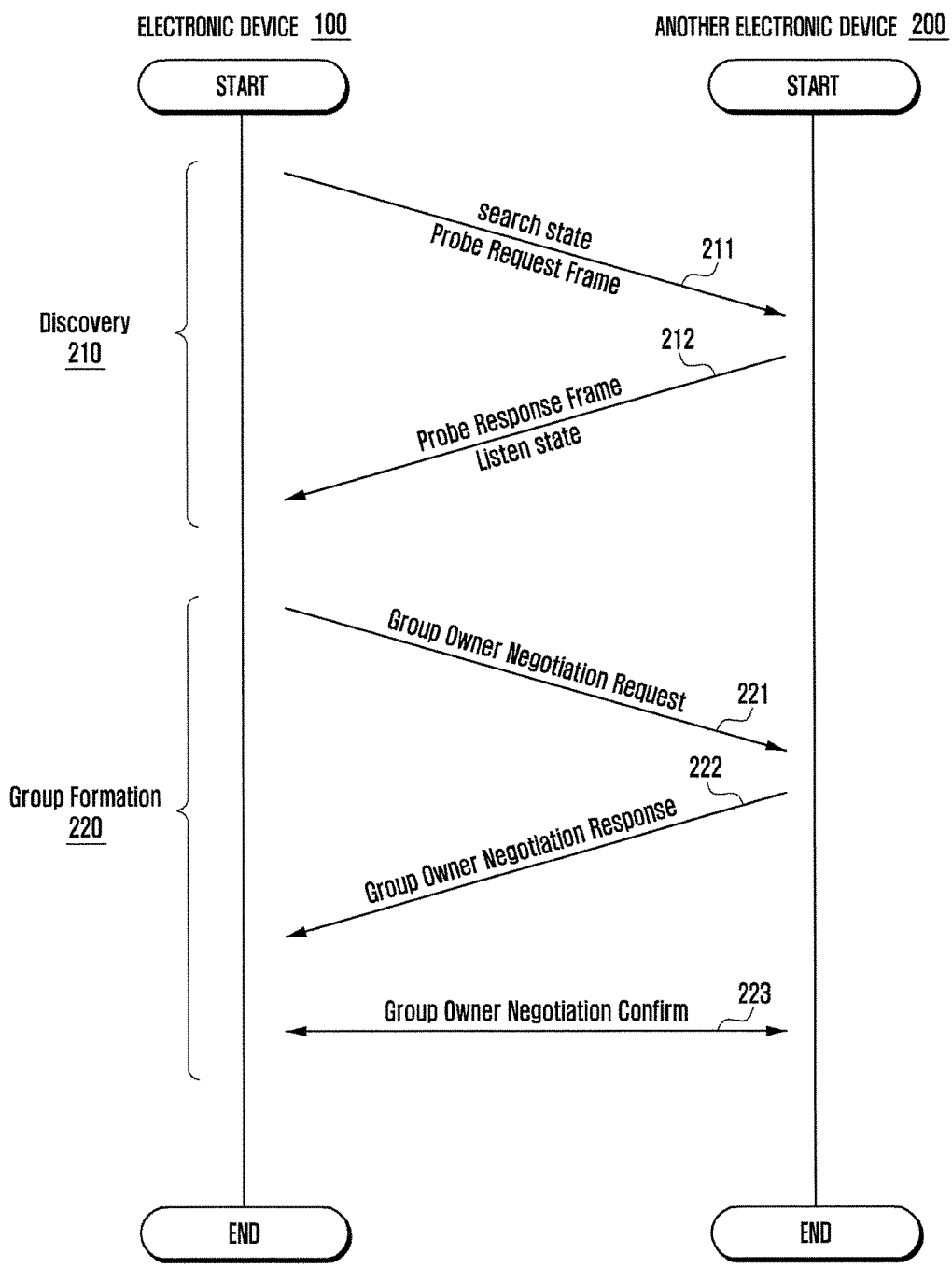
FIG. 2 illustrates a process of forming a Wi-Fi P2P group between electronic devices according to any one of various embodiments of the present disclosure.

FIG. 2 illustrates a process of forming a Wi-Fi P2P group between electronic devices 100 according to any one of various embodiments of the present disclosure. According to various embodiments of the present disclosure, a Wi-Fi P2P group between an electronic device 100 and another device 200 can be formed largely through a discovery 210 and a group formation 220.

Discovery 210 is a step of connecting the electronic devices, and is classified into a search state 211 and a listen state 212. In the search state 211, an active search is performed by using a probe request frame, and a search range is limited for a rapid search. The search is performed using social channels such as channels 1, 6, and 11.

In certain embodiments, a channel can be defined as a virtual passage for transmitting and receiving data between different electronic devices. In the listen state 212, after only one of the three social channels is selected and maintained, a probe response frame is implemented if another electronic device receives a probe request frame transmitted in the search state. The electronic device 100 and the another electronic device 200 continuously repeat the search state 211 and the listen state 212 and then reach a common channel such that a probe request frame and a probe response frame can be used.

According to various embodiments of the present disclosure, the electronic device 100 forms a Wi-Fi P2P group with another electronic device 200 through a discovery 210 process and a group formation 220 process.

In the search state 211 process, the electronic device 100 searches for another electronic device 200 by transmitting a probe request frame and limits a search range for a rapid search. Another electronic device 200 can be searched for by selecting one of the social channels from the search range.

In the listen state 212 process, the electronic device 100 receives a probe response frame of another electronic device 200. The another electronic device 200 transmits a probe response frame to the electronic device 100 in response to the probe request frame transmitted by the electronic device 100.

After the discovery 210 process, a GO is selected through a group formation 220 process, and then a GO negotiation step can be performed.

The GO negotiation step includes a GO negotiation request 221 process of requesting GO negotiation, a GO negotiation response 222 process of responding to the GO negotiation request, and a GO negotiation confirm 223 process of fixing a GO. In the GO negotiation request 221 process and the GO negotiation response 222 process, frames including P2P IE information and WSC IE information can be exchanged.

In the GO negotiation request 221 process, the electronic device 100 negotiates a GO with the another electronic device 200 by transmitting a GO negotiation request frame.

In the GO negotiation response 222 process, the electronic device 100 receives a GO negotiation response frame of the another electronic device 200. The another electronic device 200 transmits a GO negotiation response frame to the electronic device 100 in response to the GO negotiation request frame transmitted by the electronic device 100.

In certain embodiments, the GO negotiation request 221 frame and the GO negotiation response 222 frame include P2P IE information and WSC IE information.

A field of P2P IE includes information such as P2P Capability, P2P Device Info, GO Intent, Configuration Timeout, Listen Channel, Extended Listen Timing, Intended P2P Interface Address, Channel List, and Operating Channel attributes, and a field of WSC-IE includes information such as device password ID, manufacturer, model name, model number, serial number, and device name. In certain embodiments, the another electronic device 200 includes the same function and configuration as those of the electronic device 100.

According to various embodiments of the present disclosure, the electronic device 100 which will form a Wi-Fi P2P group compares intent values included in P2P IE. After the comparison, as a device having the highest intent value among a plurality of P2P devices is set as a GO and the remaining devices are set as GCs, a process of forming a Wi-Fi P2P group can be completed.

According to various embodiments of the present disclosure, if the group formation process is completed, the GO devices starts to act as a GO and the GC devices connect to the GO device such that a plurality of electronic devices are connected to a Wi-Fi P2P group.

Figure 3:
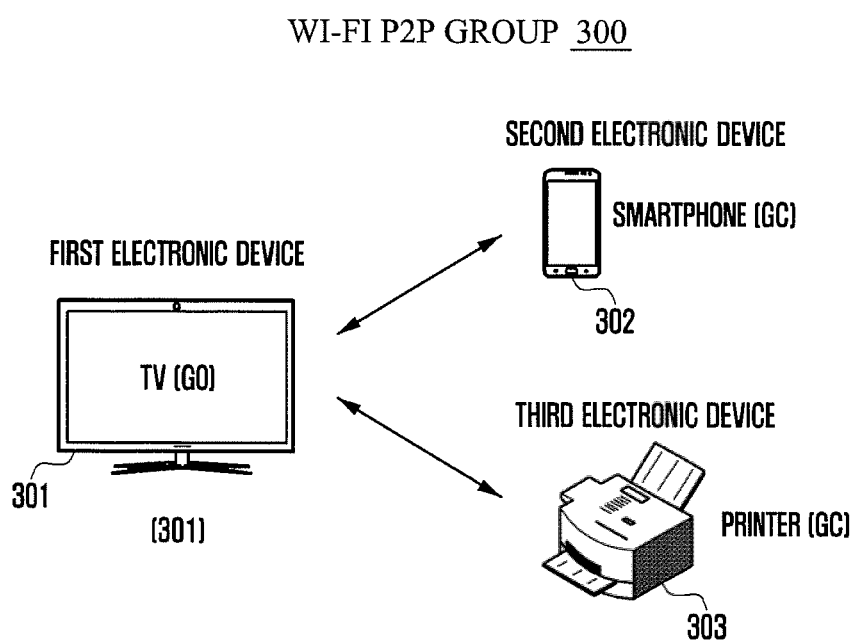
FIG. 3 illustrates a Wi-Fi P2P group formed between electronic devices according to any one of various embodiments of the present disclosure.

FIG. 3 illustrates a Wi-Fi P2P group 300 formed between electronic devices 100 according to any one of various embodiments of the present disclosure.

According to various embodiments of the present disclosure, a first electronic device 301 is a TV, a second electronic device 302 is a smartphone, and a third electronic device 303 is a printer. A device that pertains to the Wi-Fi P2P group 300 includes a communication module that observes the standard of IEEE 802.11 of a wireless LAN and includes a communication module having standards of 802.11g or more, for example, 802.11g or 802.11n.

In certain embodiments, the first electronic device 301 operates as a GO and acts as an AP in the Wi-Fi P2P group 300 including the second electronic device 302 and the third electronic device 303 as GCs. Meanwhile, the first to third electronic devices can include the same function and configuration as those of the electronic device 100.

Figure 4:
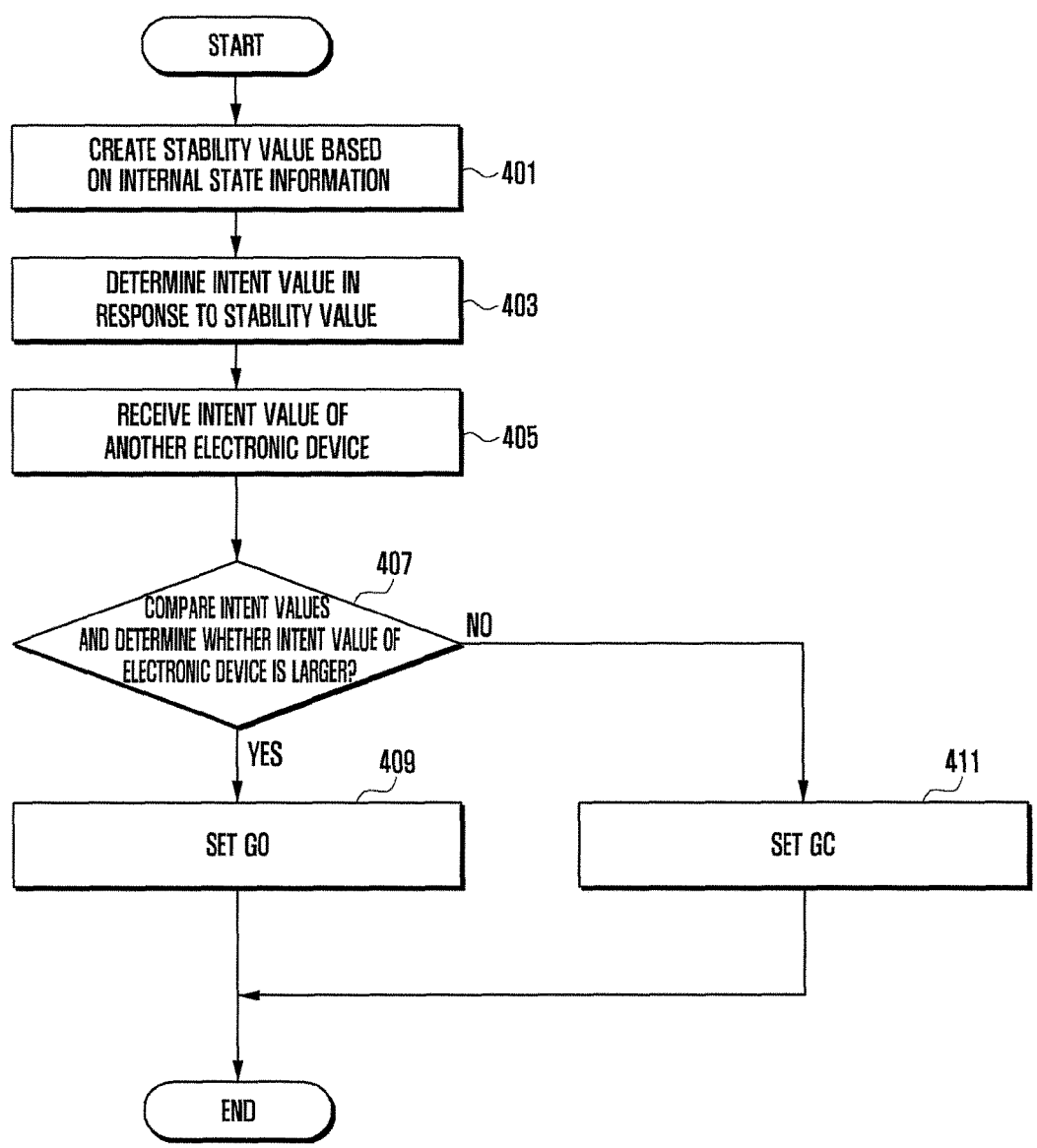
FIG. 4 illustrates a process of forming a Wi-Fi P2P group by adjusting an intent value according to internal state information of an electronic device according to any one of various embodiments of the present disclosure.

FIG. 4 illustrates a process of forming a Wi-Fi P2P group by adjusting an intent value according to internal state information of an electronic device 100 according to any one of various embodiments of the present disclosure.

According to various embodiments of the present disclosure, an intent value of the another electronic device is included in the field, such as a GO intent of P2P IE which has been described with reference to FIG. 2, and thus can be identified.

In step 401, the electronic device 100 creates a stability value of the electronic device 100 based on internal state information of the electronic device 100 through a stability value creation module 171 of the controller 170. In step 403, the electronic device 100 determines an intent value of the electronic device 100 in correspondence to a lookup table regarding a correlation between a stability value created through an intent value determination module 172 of the controller 170 and stored in the storage unit 140 and an intent value. In step 405, the electronic device 100 receives an intent value of another electronic device 200 using a Wi-Fi module 135 In step 407, the electronic device 100 compares the intent value of the electronic device 100 and the intent value of the another electronic device 200 through a GO/GC setting module 173 of the controller 170.

If an intent value of the electronic device 100 and an intent value of the another electronic device 200 are compared and, as a result, the intent value of the electronic device 100 is higher than the intent value of the another electronic device 200, the electronic device 100 acts as a GO in step 409.

If an intent value of the electronic device 100 and an intent value of the another electronic device 200 are compared and, as a result, the intent value of the electronic device 100 is lower than the intent value of the another electronic device 200, the electronic device 100 acts as a GC in step 411.

Wi-Fi Direct sets an intent value at random, irrespective of the characteristics of the electronic devices. For example, Wi-Fi Direct sets one of values from 0 to 15 as an intent value irrespective of the characteristics of the electronic devices. Accordingly, the electronic device operated through a battery has an intent value higher than that of an electronic device normally operated through a power source and thus can be operated as a GO in a Wi-Fi P2P group, so that the battery can be rapidly consumed.

Unlike the existing technology, an intent value of the electronic device 100 can be determined based on internal state information of the electronic device 100 according to any one of various embodiments of the present disclosure.

According to an embodiment of the present disclosure, the electronic device 100 creates a stability value of the electronic device 100 based on the internal state information, determines an intent value of the electronic device 100 in correspondence to the stability value, receives an intent value of the at least one another electronic device 200, and compares the intent value of the electronic device 100 with the intent value of the at least one another electronic device 200 to form a Wi-Fi P2P group in which the electronic device 100 functions as any one of a GO and a GC.

Figure 5:
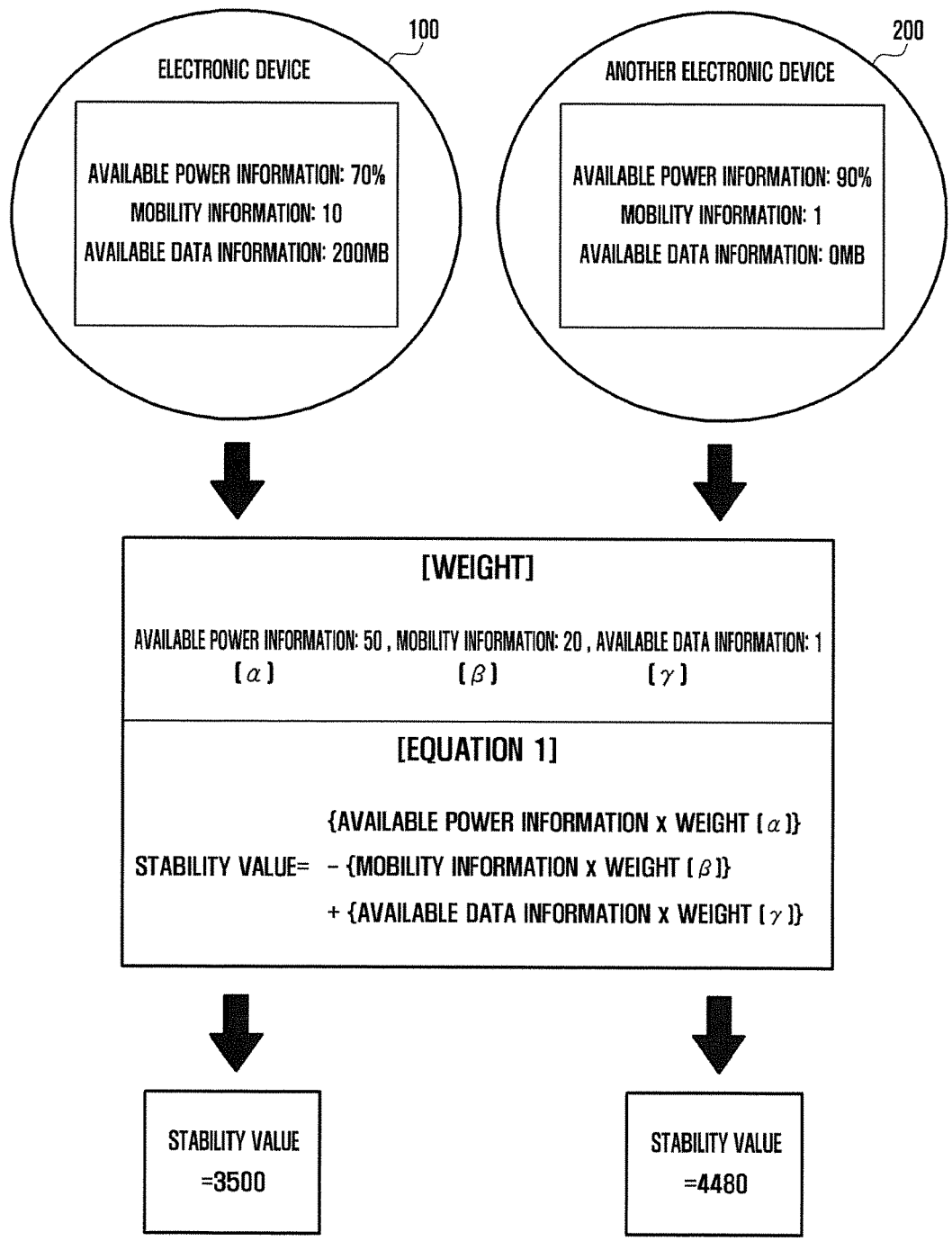
FIG. 5 illustrates a process of forming a Wi-Fi P2P group by adjusting an intent value according to internal state information of a P2P device according to any one of various embodiments of the present disclosure.

FIGS. 5 and 6 illustrate a process of forming a Wi-Fi P2P group by adjusting an intent value according to the internal state information of a P2P device and the created stability value according to any one of various embodiments of the present disclosure.

The internal state information of the electronic device disclosed in FIG. 5, a weight for creation of a stability value and Equation 1 support any one of various embodiments of the present disclosure, and various embodiments of the present disclosure are not limited thereto.

Referring to FIG. 5, available power information can be calculated using a remaining level of the battery of the electronic device 100. For example, if the remaining level of the battery of the electronic device 100 is 70% full, the available power information can be evaluated as 70. Mobility information can be calculated using a value measured by an acceleration sensor of the electronic device 100. For example, the mobility information can vary according to a location change measured using the sensor unit 150 and the GPS 138 of the electronic device 100, and the mobility information can be evaluated as a larger value as the location change of the electronic device 100 becomes larger. For example, the mobility information of the electronic device 100 can be assumed to be 10. Available data information can be calculated using an amount of data that can be downloaded by the electronic device 100. For example, if the amount of data that can be downloaded by the electronic device 100 is 200 MB, the available data information can be evaluated as 200.

Referring to FIG. 5, available power information can be calculated using a remaining level of the battery of the another electronic device 200. For example, if the remaining level of the battery of the another electronic device 200 is 90% full, the available power information can be evaluated as 90. Mobility information can be calculated using a value measured by an acceleration sensor of the another electronic device 200. For example, the mobility information can vary according to a location change of the another electronic device 200, and the mobility information can be evaluated as a larger value as the location change of the another electronic device 200 becomes larger. Meanwhile, the mobility information of the another electronic device 200 can be assumed to be 1. Available data information can be calculated using an amount of data that can be downloaded by the another electronic device 200. For example, if the amount of data that can be downloaded by the another electronic device 200 is 0 MB, the available data information can be evaluated as 0.

Referring to FIG. 5, the electronic device 100 sets the weights of internal state information elements to create a stability value of the electronic device 100. For example, it can be assumed that the weight of the available power information is 50, the weight of the mobility information is 20, and the weight of the available data information is 1 (per 1 MB). In certain embodiments, the weights of the internal state information elements are values that can be determined by a policy, a manufacturer, or settings of the user.

According to various embodiments of the present disclosure, stability values of the electronic device 100 and the another electronic device 200 can be created through the assumption or the stability values can be calculated in Equation 1. As a change in the mobility information becomes larger, a stable function of the GO deteriorates, and thus the stability value can be a negative value.

Stability value={Available power information×Available power weight($\alpha$)}−{Mobility information×Mobility weight($\beta$)}+{Available data information×Available data weight($\gamma$)}    Equation 1

In Equation 1, the electronic device 100 has a stability value of 70×50−10×20+200×1=3500 and the another electronic device 200 has a stability value of 90×50−1×20+0×1=4480.

Referring to FIGS. 5 and 6, a stability value can be substituted in the lookup table regarding a correlation between the stability values and the intent values stored in the storage unit 140 of the electronic device 100 so that an intent value of the electronic device 100 can be determined.

For example, the intent value of the electronic device 100 can be determined to be 8 because the stability value of the electronic device 100 is 3500, and the intent value of the another electronic device 200 can be determined to be 11 because the stability value of the another electronic device 200 is 4408.

According to certain embodiments, the electronic device 100 receives an intent value of the another electronic device 200 in step 405, and the intent value of the electronic device 100 and the intent value of the another electronic device 200 can be compared in step 407.

In step 407, because the intent value of the electronic device 100 is lower than the intent value of the another electronic device 200, the electronic device 100 is set as a GC and the another electronic device 200 is set as a GO so that a Wi-Fi P2P group is formed.

According to various embodiments of the present disclosure, the electronic device 100 having a low stability value can be prevented from being set as a GO, considering the internal state information of the electronic devices and the another electronic device 200 having a high stability value can be set as a GO, so that a stable Wi-Fi P2P group can be formed. Because the present disclosure uses an intent value that considers a stability value unlike the existing technology using an arbitrary intent value, the electronic device selected as the GO can manage a more stable Wi-Fi P2P group.

Figure 7:
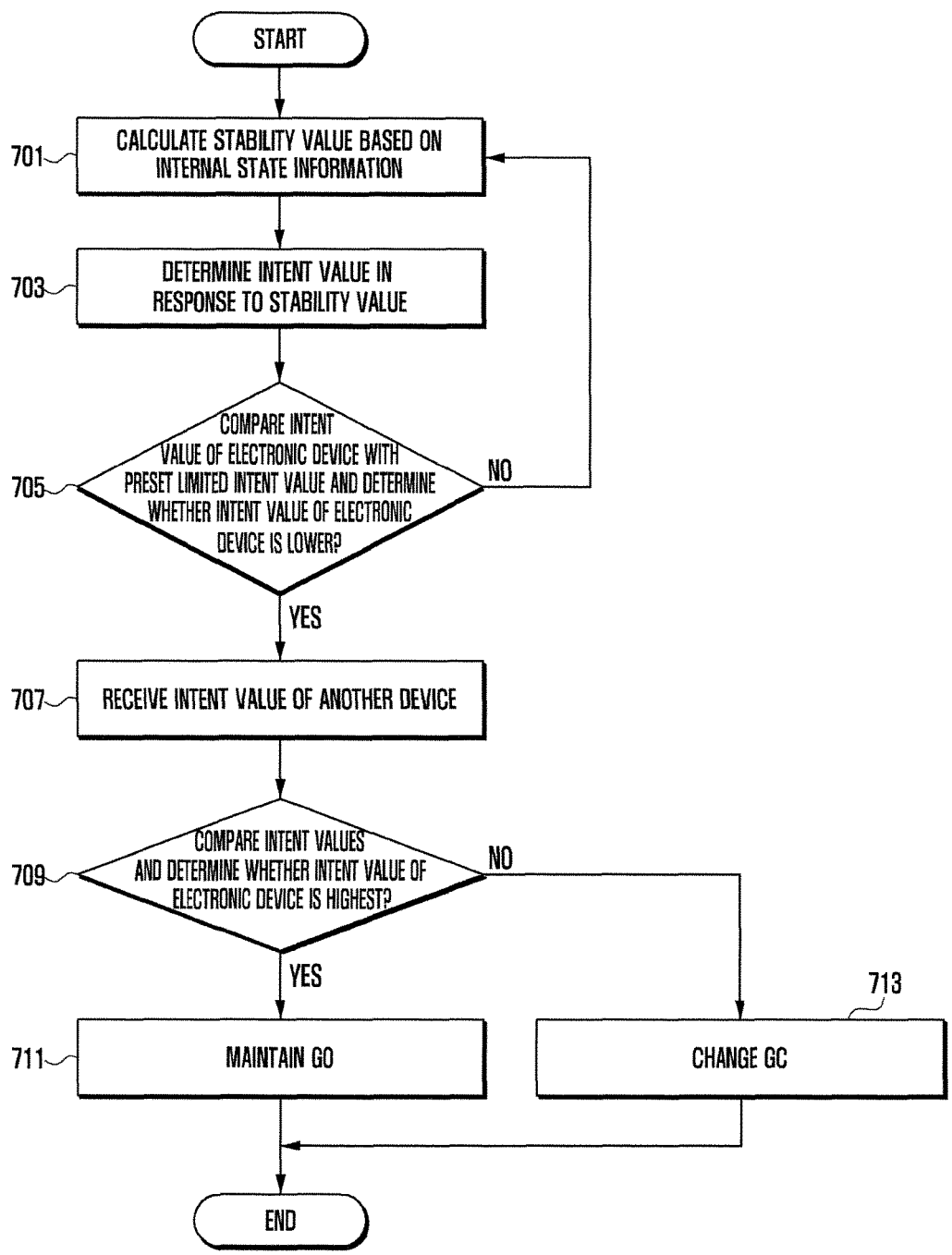
FIG. 7 illustrates a process of, when it is determined that a group owner (GO) cannot be maintained after an electronic device performing the GO renews internal state information, reselecting a GO of a preformed group according to any one of various embodiments of the present disclosure.

FIG. 7 illustrates a process of, when it is determined that a GO cannot be maintained after an electronic device 100 performing the GO renews internal state information, reselecting a GO of a preformed group according to any one of various embodiments of the present disclosure.

In step 701, the electronic device 100 acting as a GO acquires internal state information at a predetermined period to create a stability value of the electronic device 100. In step 703, the electronic device 100 substitutes the recreated stability value in the lookup table regarding a correlation between the stability values and the intent values stored in the storage unit 140 such that the intent value of the electronic device 100 can be determined. In step 705, the determined intent value of the electronic device 100 is compared with a preset limited intent value. When the determined intent value of the electronic device 100 is equal to or higher than the preset limited intent value, the process is branched to step 701 such that internal state information of the terminal can be consistently collected. When the determined intent value of the electronic device 100 is lower than the preset limited intent value, the electronic device 100 receives an intent value of another electronic device 200 using a Wi-Fi module 135 in step 707. In step 709, the electronic device 100 compares the intent value of the electronic device 100 with the intent value of the another electronic device 200.

If the intent value of the electronic device 100 and the intent value of the another electronic device 200 are compared and, as a result, the intent value of the electronic device 100 is higher than the intent value of the another electronic device 200, the electronic device 100 continuously acts as a GO in step 711.

If the intent value of the electronic device 100 and the intent value of the another electronic device 200 are compared and, as a result, the intent value of the electronic device 100 is lower than the intent value of the another electronic device 200, the electronic device 100 acts as a GC in step 713.

According to various embodiments of the present disclosure, when the remaining level of the battery of the another electronic device 200 selected as the GO changes from 90% to 10%, with the assumption that the mobility information and the available data information are the same, the stability value is calculated to be 10×50−1×20+0×1=480. If the recalculated stability value of the another electronic device 200 is substituted in the lookup table of FIG. 6, the intent value of the another electronic device 200 is renewed to 1. If the arbitrary specific value is 2, GO renegotiation can be requested by the electronic device 100 such that the another electronic device 200 which is a GO reselects a GO of the preformed Wi-Fi P2P group because the renewed intent value of the another electronic device 200 is 1.

In certain embodiments, if the remaining level of the battery of the electronic device 100 changes from 70% to 40%, with the assumption that the mobility information and the data information are the same, the stability value is calculated to be 40×50−10×20+200×1=2000. If the recalculated stability value of the electronic device 100 is substituted in the lookup table of FIG. 6, the intent value of the electronic device 100 is renewed to 5. Accordingly, if the electronic device 100 and the another electronic device 200 perform GO renegotiation, the electronic device 100 can be operated as a GO at this time.

According to various embodiments of the present disclosure, the electronic device 100 forms the initial Wi-Fi P2P group and reselects a GO of the preformed Wi-Fi P2P group to form a Wi-Fi P2P group. Because the GO consumes a lot of battery power compared with the GCs, stability of a portable terminal such as a smartphone can rapidly decrease, and accordingly, a problem can occur in stably managing the Wi-Fi P2P group. Accordingly, when an arbitrary specific value is set and the intent value of the electronic device 100 is lower than the corresponding value, GO renegotiation can be requested by the another electronic device such that the Wi-Fi P2P group can be maintained more stably.

According to various embodiments of the present disclosure, the electronic device 100 changes only the GO and the GC while not breaking the existing connection when the GO of the Wi-Fi P2P group is reselected. For example, when a status of the GO is succeeded from the electronic device 100 to the another electronic device 200, only the functions of the GO and the GC can be simply changed while the connection of the preformed Wi-Fi group is maintained.

According to various embodiments of the present disclosure, the electronic device 100 classifies the actual timing for changing the GO or the GC when the GO or the GC is reselected. For example, when the electronic devices that will be set as the GO and the GC are not performing data-communication with each other, or the electronic device can be immediately changed to the GO or the GC.

According to various embodiments of the present disclosure, when the electronic devices that will be set as the GO and the GC are performing data-communication with each other, the electronic device can be changed to the GO or the GC after the data communication which is currently being performed is completed.

According to various embodiments of the present disclosure, the electronic device receives a request for data communication while the electronic device is being reset to the GO or the GC. In certain embodiments, the electronic device stores buffer data on which a request for communication is made, and then retransmits data stored in the buffer after the resetting is completed.

Figure 8:
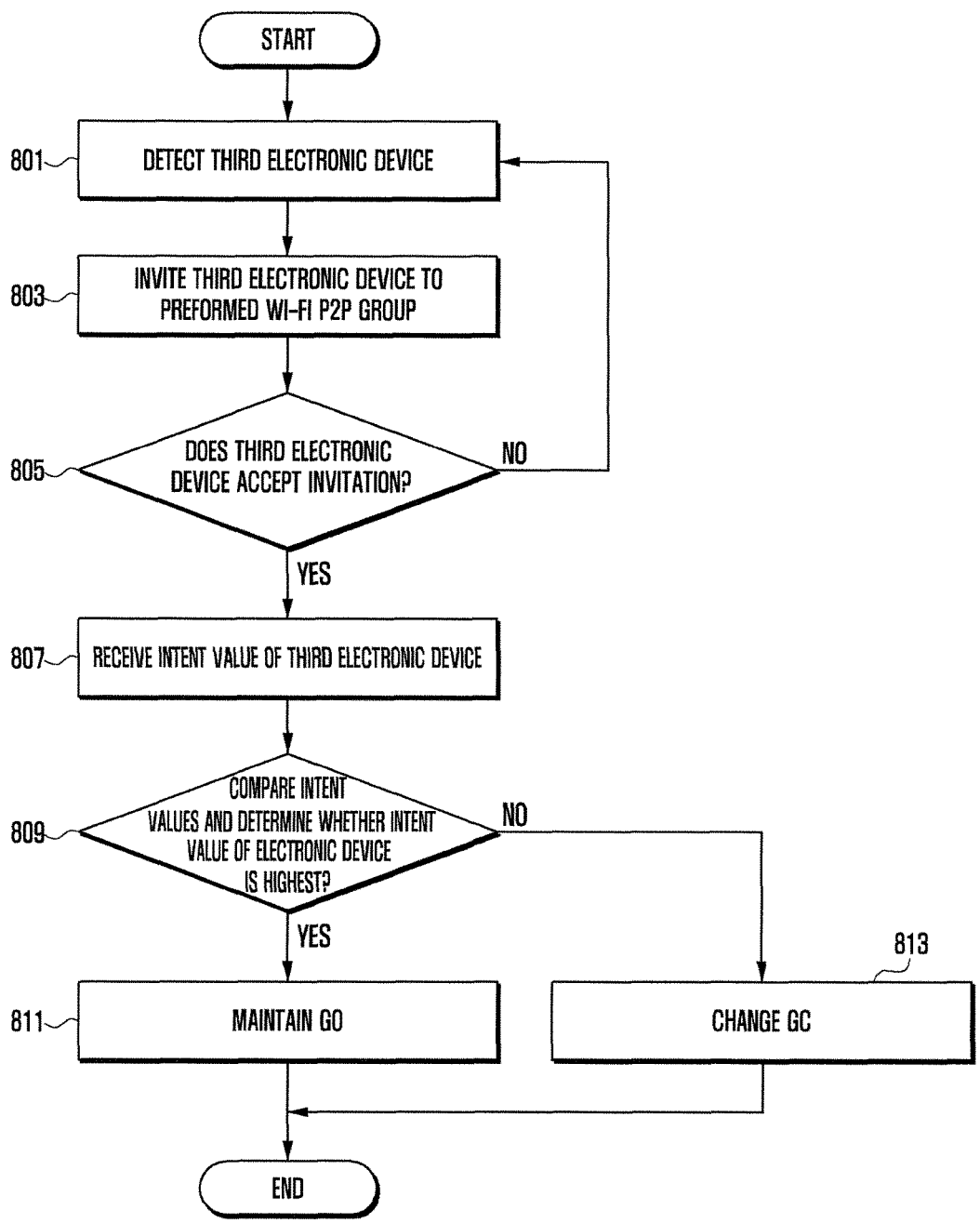
FIG. 8 illustrates a process of, when another electronic device is added to a preformed Wi-Fi P2P group, reselecting a GO of the preformed Wi-Fi P2P group, according to embodiments of the present disclosure.

FIG. 8 illustrates a process of, when a third electronic device is added to a preformed Wi-Fi P2P group, reselecting a GO of the preformed Wi-Fi P2P group, according to embodiments of the present disclosure.

In step 801, the electronic device 100 acting as the GO searches for another electronic device that does not pertain to the Wi-Fi P2P group using the Wi-Fi module 135 at a predetermined period. In step 803, if the another electronic device that does not pertain to the Wi-Fi P2P group is found, the electronic device 100 transmits a message inviting the another electronic device that does not pertain to the Wi-Fi P2P group to the preformed Wi-Fi P2P group using the Wi-Fi module 135. In step 805, the electronic device 100 identifies whether the another electronic device that does not pertain to the Wi-Fi P2P group accepts the invitation using the Wi-Fi module 135. When the another electronic device that does not pertain to the Wi-Fi P2P group does not accept the invitation, the electronic device 100 proceeds to step 801 and successively search for the another electronic device that does not pertain to the Wi-Fi P2P group at a predetermined period. When the another electronic device that does not pertain to the Wi-Fi P2P group does accept the invitation, the electronic device 100 receives an intent value of the another electronic device that does not pertain to the Wi-Fi P2P group using the Wi-Fi module 135 in step 807. In step 809, the electronic device 100 compares the intent value of the electronic device 100 with the intent values of another electronic device that pertains to at least one Wi-Fi P2P group and another electronic device that does not pertain to the Wi-Fi P2P group.

When the intent value of the electronic device 100 and the intent values of the another electronic device that pertains to the at least one Wi-Fi P2P group and the another electronic device that does not pertain to the Wi-Fi P2P group are compared, and, as a result, the intent value of the electronic device 100 is the highest, the electronic device 100 successively acts as the GO in step 811.

When the intent value of the electronic device 100 and the intent values of the another electronic device that pertains to the at least one Wi-Fi P2P group and the another electronic device that does not pertain to the Wi-Fi P2P group are compared and as a result, the intent value of the electronic device 100 is not the highest, the electronic device 100 acts as a GC in step 813.

According to various embodiments of the present disclosure, the electronic device 100 forms the initial Wi-Fi P2P group and reselects a GO of the preformed Wi-Fi P2P group to form a Wi-Fi P2P group. Because the GO consumes a lot of battery power compared with the GC, stability of a portable terminal, such as a smartphone, can rapidly decrease, and accordingly, a problem can occur in stably managing the Wi-Fi P2P group. Accordingly, when an arbitrary specific value is set and the intent value of the electronic device 100 is lower than the corresponding value, GO renegotiation can be requested from the another electronic device such that the Wi-Fi P2P group can be maintained more stably.

According to various embodiments of the present disclosure, the electronic device 100 only changes the GO and the GC while not breaking the existing connection when the GO of the Wi-Fi P2P group is reselected. For example, when a status of the GO is succeeded from the electronic device 100 to the another electronic device 200, only the functions of the GO and the GC are changed while the connection of the preformed Wi-Fi group is maintained.

According to various embodiments of the present disclosure, the electronic device 100 classifies the actual timing for changing the GO or the GC when the GO or the GC is reselected. For example, when the electronic devices that will be set as the GO and the GC are not data-communicating with each other, the electronic devices can be immediately changed to the GO or the GC.

According to various embodiments of the present disclosure, when the electronic devices that will be set as the GO and the GC are performing data-communication with each other, the electronic device can be changed to the GO or the GC after the data communication which is currently being performed is completed.

According to various embodiments of the present disclosure, the electronic device receives a request for data communication while the electronic device is being reset to the GO or the GC. In certain embodiments, the electronic device stores buffer data on which a request for communication is made, and then retransmits data stored in the buffer after the resetting is completed.

In certain embodiments, if another electronic device that will be newly added is a TV, power is always stably supplied to the another electronic device and thus it can be assumed that the value of available power information is 100, mobility information is 0, and available data information is 0. In this case, the stability value of the TV is calculated to be 100×50−0×20+0×1=5000. If the calculated stability value of the TV is substituted in the lookup table of FIG. 6, the intent value of the TV is determined to be 11.

If it is assumed that the intent value of the electronic device that pertains to the preformed Wi-Fi P2P group is 4 and the intent value of the another electronic device is 5, the newly added TV operates as a GO of a Wi-Fi P2P group that will be newly formed because the intent value of the newly added TV is the highest.

According to various embodiments of the present disclosure, the electronic device 100 forms the initial Wi-Fi P2P group and reselects a GO of the preformed Wi-Fi P2P group by adding a new electronic device to form a Wi-Fi P2P group.

According to various embodiments, at least a part of the device, such as the controller 170 and the modules thereof, or the method, such as operations, according to the present disclosure can be implemented by an instruction stored in a computer-readable storage medium in the form of a programming module. When the command is executed by one or more processors, the one or more processors can perform a function corresponding to the command.

Although not shown, the computer-readable storage medium can, for example, be a storage unit or memory. At least some of the programming modules can be implemented (for example, executed) by, for example, the processor. At least some of the programming modules can include, for example, a module, a program, a routine, a set of instructions, or a process for performing one or more functions.

The computer readable recording medium can include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory.

In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

The programming module according to the present disclosure can include one or more of the aforementioned components or can further include other additional components, or some of the aforementioned components can be omitted. Operations executed by a module, a programming module, or other component elements according to various embodiments of the present disclosure can be executed sequentially, in parallel, repeatedly, or in a heuristic manner. Further, some operations can be executed according to another order or can be omitted, or other operations can be added.

Meanwhile, the exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of forming a Wi-Fi direct group of an electronic device with at least one external electronic device, the method comprising:
   creating a stability value of the electronic device based on internal state information of the electronic device, the internal state information comprising mobility information, available power information, and available data information;
   determining an intent value of the electronic device in response to the stability value;
   receiving an intent value of the at least one external electronic device;
   comparing the intent value of the electronic device with the intent value of the at least one external electronic device; and
   forming, based on the comparing, the Wi-Fi direct group acting as any one of a group owner (GO) and a group client (GC),
   wherein the stability value is created by considering weights of each information of the internal state information.

2. The method of claim 1, further comprising:
   while the electronic device acts as the GO in the Wi-Fi direct group, reforming the Wi-Fi direct group in a manner that the GO or the GC of the Wi-Fi direct group is reselected if the intent value of the electronic device is lower than a preset limited intent value.

3. The method of claim 1, further comprising:
   while the electronic device acts as the GO in the Wi-Fi direct group, inviting a third electronic device to a reformed Wi-Fi direct group by the electronic device; and if the third electronic device accepts an invitation, reforming the Wi-Fi direct group in a manner that the GO or the GC of the Wi-Fi direct group including the third electronic device is reselected.

4. The method of claim 1, wherein the available power information comprises at least one of whether regular power is supplied to the electronic device, whether a charger is connected to the electronic device, and a remaining level of a battery of the electronic device.

5. The method of claim 1, wherein the mobility information comprises at least one of a change in an acceleration sensor, a change in a gravity sensor, and a change in a global positioning system (GPS).

6. The method of claim 1, wherein the stability value is created by considering a weight of at least one of available power information, mobility information, and available data information.

7. The method of claim 1, wherein the intent value is determined in response to a lookup table in which the stability value is stored in advance.

8. The method of claim 1, wherein forming of the Wi-Fi direct group comprises, when the intent value of the electronic device is higher than the intent value of the at least one external electronic device, the electronic device acts as a GO.

9. The method of claim 1, wherein forming of the Wi-Fi direct group comprises, when the intent value of the electronic device is lower than the intent value of the at least one external electronic device, the electronic device acts as a GC.

10. The method of claim 2, wherein the reforming of the Wi-Fi direct group comprises, if an electronic device that will reform the Wi-Fi direct group performs data communication, the Wi-Fi direct group is reformed after the data communication is completed.

11. The method of claim 2, further comprising:
    receiving a request for data communication while the Wi-Fi direct group is reformed;
    storing data in a buffer; and
    after the Wi-Fi direct group is reformed, retransmitting the data.

12. An electronic device comprising:
    a Wi-Fi module; and
    a processor connected to the Wi-Fi module, and configured to:
    create a stability value of the electronic device based on internal state information of the electronic device, the internal state information comprising mobility information, available power information, and available data information;
    determine an intent value of the electronic device in response to the created stability value;
    receive an intent value of at least one external electronic device;
    compare the intent value of the electronic device with the intent value of the at least one external electronic device; and
    form, based on the comparing, a Wi-Fi direct group acting as any one of a group owner (GO) and a group client (GC),
    wherein the stability value is created by considering weights of each information of the internal state information.

13. The electronic device of claim 12, wherein, while the electronic device acts as the GO in the Wi-Fi direct group, the processor is configured to reform the Wi-Fi direct group in a manner that the GO or the GC of the Wi-Fi direct group is reselected if the intent value of the electronic device is lower than a preset limited intent value.

14. The electronic device of claim 12, wherein, while the electronic device acts as the GO in the Wi-Fi direct group, the processor is further configured to:
   invite a third electronic device to the Wi-Fi direct group, and
   reform the Wi-Fi direct group in a manner that the GO or the GC of the Wi-Fi direct group including the third electronic device is reselected if the third electronic device accepts an invitation.

15. A non-transitory computer readable recording medium storing instructions to perform a method of forming a Wi-Fi direct group of an electronic device with at least one external electronic device, the method comprising:
   creating a stability value of the electronic device based on internal state information of the electronic device, the internal state information comprising mobility information, available power information, and available data information;
   determining an intent value of the electronic device in response to the stability value;
   receiving an intent value of the at least one external electronic device;
   comparing the intent value of the electronic device with the intent value of the at least one external electronic device; and
   forming, based on the comparing, the Wi-Fi direct group acting as any one of a group owner and a group client,
   wherein the stability value is created by considering weights of each information of the internal state information.

* * * * *